United States Patent [19]

Shimano

[11] 4,348,198

[45] Sep. 7, 1982

[54] BICYCLE DERAILLEUR HAVING A REDUCED LATERAL WIDTH

[75] Inventor: Keizo Shimano, Sakai, Japan

[73] Assignee: Shimano Industrial Company Limited, Osaka, Japan

[21] Appl. No.: 142,380

[22] Filed: Apr. 21, 1980

[30] Foreign Application Priority Data

May 4, 1979 [JP] Japan .............................. 54-59801[U]

[51] Int. Cl.³ ........................................... F16H 7/22
[52] U.S. Cl. ...................................... 474/82; 474/80; 474/135
[58] Field of Search .................. 474/80, 82, 133, 134, 474/135

[56] References Cited

U.S. PATENT DOCUMENTS 3,817,113 6/1974 Pfarrwaller ........................ 474/135
4,061,048 12/1977 Huret et al. ............................ 474/82

FOREIGN PATENT DOCUMENTS

| 8974 | 12/1956 | Fed. Rep. of Germany | 474/80 |
| 1029248 | 4/1958 | Fed. Rep. of Germany | 474/135 |
| 1054335 | 4/1959 | Fed. Rep. of Germany | 474/80 |
| 844979 | 8/1939 | France . | |
| 925850 | 9/1947 | France . | |
| 974676 | 2/1951 | France . | |
| 1021813 | 2/1953 | France . | |
| 645791 | 11/1950 | United Kingdom | 474/80 |
| 878199 | 9/1961 | United Kingdom | 474/82 |
| 988439 | 4/1965 | United Kingdom . | |

*Primary Examiner*—Lawrence J. Staab
*Attorney, Agent, or Firm*—Stevens, Davis, Miller & Mosher

[57] ABSTRACT

A derailleur for a bicycle, in which a supporting member is supported movably to a fixing member and a change-over frame is fixed swingably to the supporting member through a first horizontal shaft. The derailleur is characterized in that a second tubular shaft is sleeved onto the first shaft coaxially therewith, a first pulley is supported rotatably to the second shaft, a tubular chamber is formed between the outer periphery of the first shaft and the inner periphery of the second shaft, and a coiled tension spring is housed within the chamber, thereby reducing the overall lateral width of the derailleur.

9 Claims, 6 Drawing Figures

BICYCLE DERAILLEUR HAVING A REDUCED LATERAL WIDTH

FIELD OF THE INVENTION

This invention relates to a derailleur for a bicycle, and more particularly to a derailleur for a bicycle, which is adapted to switch a driving chain to a selected one of a plurality of sprockets forming a multi-stage assembly for changing speed.

BACKGROUND OF THE INVENTION

Generally, a derailleur for a bicycle is so constructed that a shaft projects horizontally from a supporting member fixed to a fixing member and has at the foremost end a change-over frame swingably supported thereto, and a coiled tension spring is wound onto the shaft at its axially intermediate portion between the supporting member and the change-over frame, and is retained at one end to the supporting member and at the other end to the change-over frame to thereby apply constant tension to a driving chain guided by two pulleys on the frame.

A derailleur constucted like this, however, has the tension spring and change-over frame arranged on the shaft in series axially thereof. Hence, the shaft, which supports one pulley must have a length sufficient to include the tension spring and a bearing portion for the pulley. As a result, the derailleur as a whole has an increased lateral width.

SUMMARY OF THE INVENTION

An object of the invention is to provide a derailleur for a bicycle, which is capable of supporting the change-over frame in proximity to the supporting member to thereby reduce the lateral width of the derailleur as a whole.

This invention is characterized in that a first shaft extends horizontally and supports therethrough the change-over frame swingably to the supporting member, a second shaft of a tubular shape is sleeved coaxially onto the first shaft, a first pulley is supported rotatably to the second shaft, and a tubular chamber is formed between the outer periphery of the first shaft and the inner periphery of the second shaft, the chamber housing a coiled tension spring.

The supporting member in this invention is supported to a fixing member in a relation of being movable with respect thereto. Also, the present invention has applicability to a derailleur of the so-called parallelogram linkage mechanism type, in which the supporting member is supported to the fixing member through two parallel links, and to a derailleur in which the supporting member is supported swingably to the fixing member through one shaft extending vertically, whereby the specific type of the derailleur itself is not important to the invention.

The derailleur of the invention is able to support the change-over frame in proximity with respect to the supporting member without regard to the coiled tension spring. In other words, the change-over frame is positioned in proximity to the supporting member at an interval necessary only for mounting the first pulley, that is, the change-over frame is positioned close to the supporting member to an extent of excluding the coil length of the tension spring. Consequently, it is possible to reduce lateral width of the derailleur as a whole.

The derailleur of the invention can be used with a bicycle provided even with a chain case, and has less of a projection with respect to lateral width of the bicycle, thereby lessening the danger of its being hit by a foreign object. As a result, it is possible to provide a derailleur of small size and high safety.

DETAILED DESCRIPTION OF THE INVENTION

Figure 1:
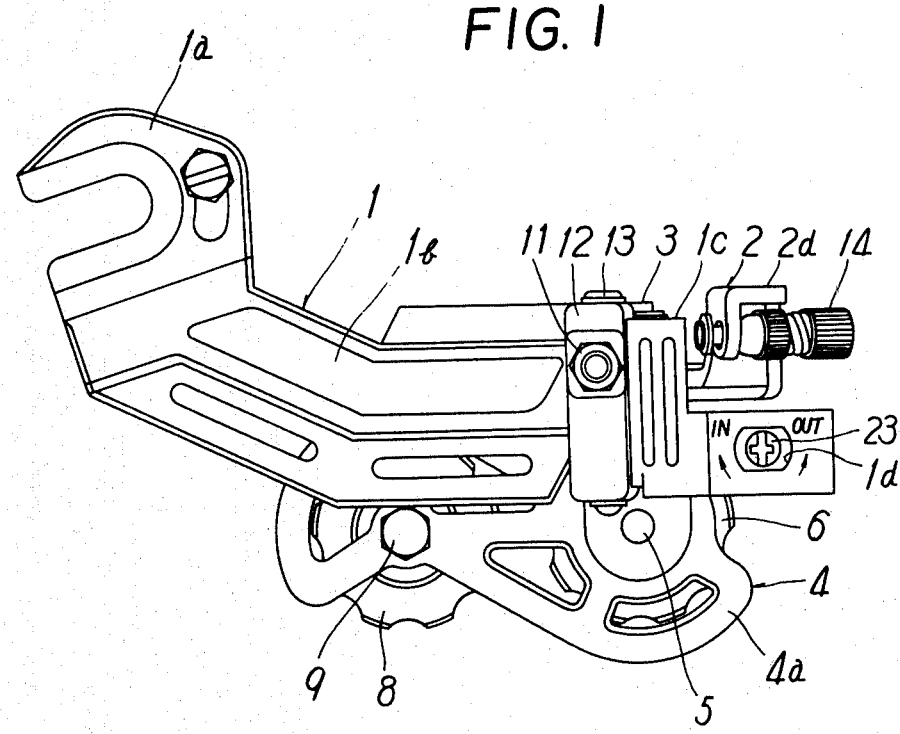
FIG. 1 is a front view of an embodiment of a derailleur of the invention.
Figure 2:
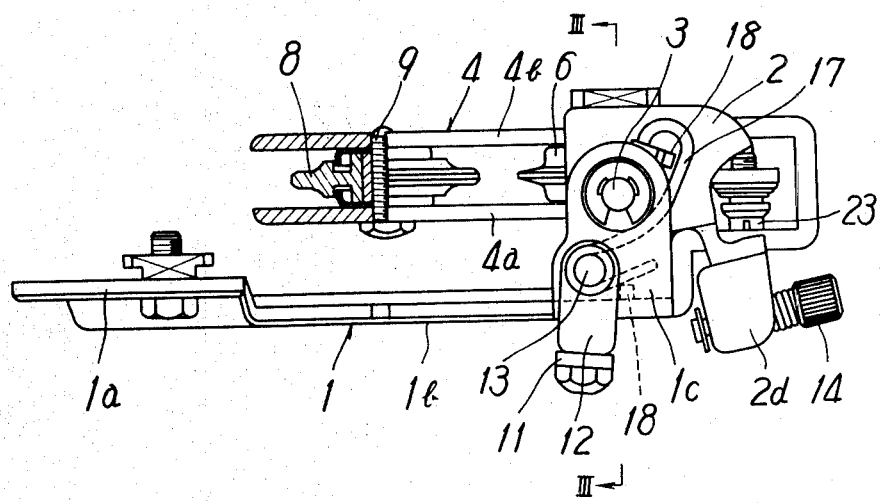
FIG. 2 is a partially cutaway plan view thereof.
Figure 3:
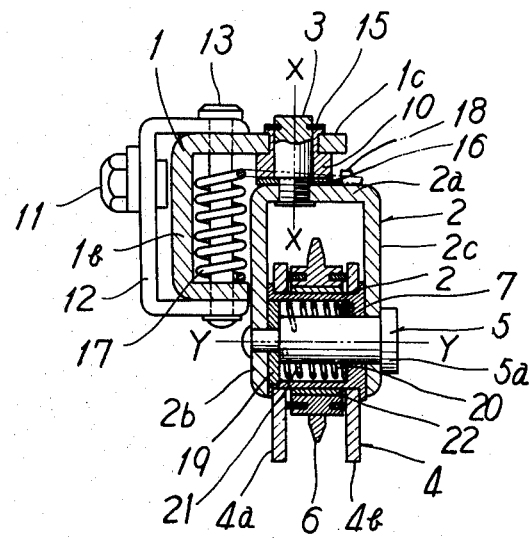
FIG. 3 is a sectional view taken on the line III—III in FIG. 2.

Referring to FIGS. 1 through 3, a two stage speed change derailleur is shown, in which no linkage mechanism is used and a supporting member is supported swingably to a fixing member.

In FIGS. 1 through 3, reference numeral 1 designates a fixing member fixed to the bicycle frame, 2 designates a supporting member supported swingably to the free end of fixing member 1 through a shaft 3 extending vertically, 4 designates a change-over frame supported swingably to the supporting member 2 through a first shaft 5 extending horizontally and having an axis intersecting the axis of the shaft 3 substantially at a right angle therewith, 6 designates a first pulley supported rotatably onto a second shaft 7 which is tubular and is sleeved coaxially onto the first shaft 5, and 8 designates a second pulley supported rotatably to the foremost end of change-over frame 4 through a third shaft 9 parallel to the first shaft 5.

The fixing member 1 comprises a bracket 1a fixed together with a hub shaft to a fork end of the bicycle and an extension 1b extending from the bracket 1a frontward of the bicycle along a chain stay thereof. The extension 1b projects horizontally from the upper edge at the front end to form a horizontal portion 1c carrying a bush 10 rotatably supporting the vertical shaft 3. An arm 12 having a fixture 11 for a control wire is supported swingably to the front end of extension 1b through a shaft 13 extending vertically.

The supporting member 2, as shown in FIG. 3, comprises a top plate 2a and opposite side plates 2b and 2c, and has an inverted-U-like shaped cross section. The vertical shaft 3 is screwed with the top plate 2a, and the first shaft 5 is fixed across the opposite side plates 2b and 2c. The top plate 2a extends to form an extension 2d on which a support 14 for an outer sheath is mounted. The shaft 3 is inserted through the bush 10 and held by an E-ring 15 to thereby support the supporting member 2 swingably to the fixing member 1. In addition, reference numeral 16 designates a washer, and 17 designates a spring wound onto the vertical shaft 13 and retained at one end to the arm 12 and at the other end to a spring seat 18 provided at the top plate 2a of supporting member 2. The spring 17 functions to both conserve energy and restore the supporting member 2.

The change-over frame 4 comprises a pair of plates 4a and 4b. The second shaft 7 is insertably fixed across the plates 4a and 4b.

The first shaft 5 is headed 5a and axially stepped. The second shaft 7 comprises a tubular member having a round bearing end face, and is sleeved rotatably onto the first shaft 5 through the bearing end face and a dish-like bush 19, thereby supporting the change-over frame 4 swingably to the supporting member 2 through the first shaft 5.

The second shaft 7 has an inner diameter larger than an outer diameter of the first shaft 5. The first pulley 6 is supported rotatably to the outer periphery of second shaft 7 through a bearing metal 22. A tubular chamber 20 is formed between the outer periphery of first shaft 5 and the inner periphery of second shaft 7, and a coiled tension spring 21 is housed within the chamber 20. The spring 21 is retained at one end to the first shaft 5 and at the other end to the second shaft 7 fixed to the change-over frame 4, thereby biasing the change-over frame 4 in the direction of stretching a driving chain (not shown).

The spring 21 functions to apply constant tension to the chain and reduces the lateral length of the derailleur as a whole in comparison with a conventional one due to the fact that the spring 21 is housed within the second shaft 7, and in turn within the first pulley 6.

In addition, an adjusting bolt 23, as shown in FIGS. 1 and 2, is provided at the supporting member 2 to adjust the range of swinging motion of change over frame 4. The adjusting bolt 23 abuts at its tip against the foremost end of extension 1b and is controllable through a window 1d formed thereat.

In the above described construction, the control wire is held at one end by the fixture 11 and the outer sheath is supported by the support 14. A control lever (not shown) is operated to pull the control wire to thereby swing the change-over frame 4 around the vertical shaft 3 against the restoring force of spring 17. Hence, the chain guided by the first and second pulleys is switched to a selected one of the multi-stage sprockets. Also, the change-over frame 4, which is biased by the spring 21 clockwise in FIG. 1, swings around the first shaft 5 following the switching of the chain, thereby keeping the chain under constant tension.

In the above described embodiment, the supporting member 2 is supported swingably by one vertical shaft 3. Alternatively, the supporting member 2, as well-known, may be supported movably to the fixing member 1 through two parallel links.

Figure 4:
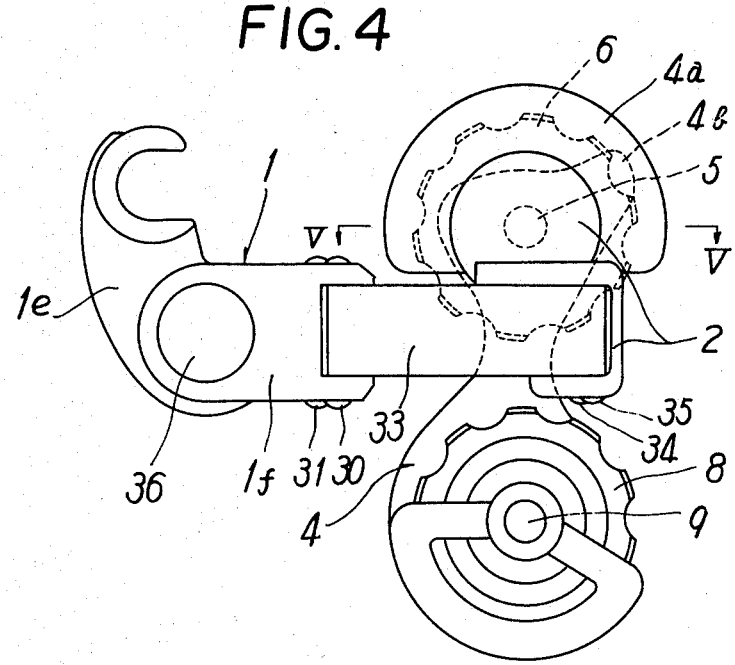
FIG. 4 is a front view of a modified embodiment of the invention.
Figure 5:
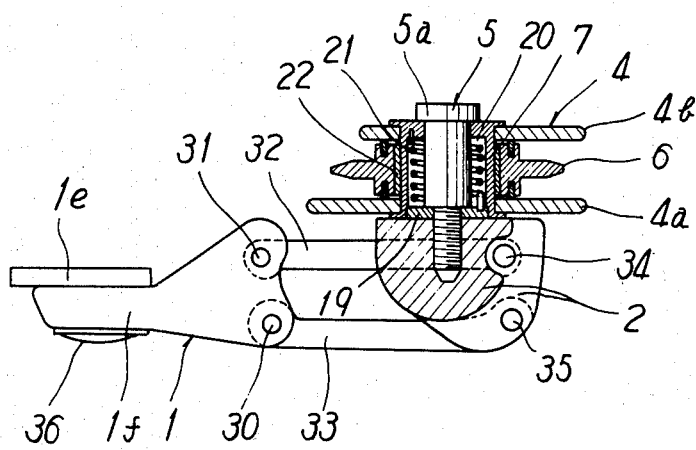
FIG. 5 is a sectional view taken on the line V—V in FIG. 4.

Such a modified embodiment is shown in FIGS. 4 and 5, in which components indentical with those in FIGS. 1 through 3 are represented by the same reference numerals. The two links 32 and 33 are pivoted to the fixing member 1 through pins 30 and 31. The supporting member 2 is supported to the free ends of links 32 and 33 through pins 34 and 35 respectively. The structure for supporting the change-over frame 4 and first pulley 6 and for mounting the tension spring 21, are the same as in the first embodiment.

Referring to FIGS. 4 and 5, the supporting member 2 has a block-like shape. The first shaft 5 is screwed in cantilever with the supporting member 2. Alternatively, the supporting member 2 may have an inverted U-shaped cross section, and the first shaft 5 may be supported at both ends across the side plates of the supporting member 2. The fixing member 1 comprises a bracket member 1e fixed to the fork end at the bicycle and a support 1f supporting the links 32 and 33, the support 1f being separate from the bracket member 1e and supported swingably thereto through a horizontal shaft 36.

Next, improvements in the embodiments shown in FIGS. 1 through 5 will be described with reference to FIG. 6.

Figure 6:
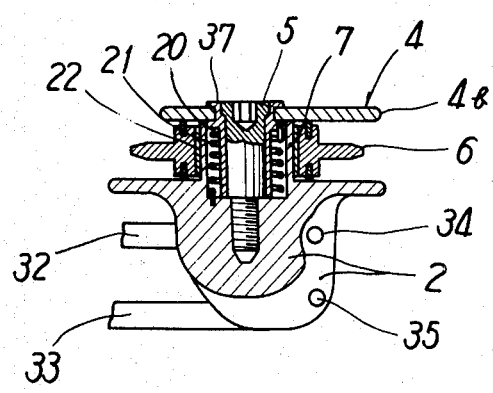
FIG. 6 is a sectional view of only the principal portion of an improvement in the embodiment shown in FIGS. 4 and 5.

As shown in FIG. 6, the second shaft 7 is fixed to the supporting member 2 or is integral therewith. The first pulley 6 is supported rotatably to the second shaft 7 through a bearing metal 22, and the change-over frame 4 is supported rotatably to the first shaft 5 fixed to the supporting member 2. In this instance, the change-over frame 4, rather than being supported to the first shaft 5 through a bush, is preferably fixed to a tubular shaft 37 which is rotatably supported to the first shaft 5 as shown in FIG. 6.

The tension spring 21, as shown in FIG. 6, is retained at one end to the supporting member 2 and at the other end to the tubular shaft 37. Alternatively, the other end of spring 21 may be retained to the change-over frame 4 in place of the tubular shaft 37.

As clearly understood from the above description, the derailleur of the invention has a second shaft 7 of tubular shape sleeved coaxially onto the first shaft 5 through which the change-over frame 4 is supported to the supporting member 2, the first pulley 6 is supported rotatably to the second shaft 7, and the coiled tension spring 21 is housed within the tubular chamber 20 formed between the outer periphery of first shaft 5 and the inner periphery of second shaft 7, whereby the first shaft 5 has a reduced axial length in comparison with the same shaft in a conventional derailleur, thus supporting the change-over frame 4 in proximity to the supporting member 2.

Accordingly, a derailleur incorporating the structures of the invention has a reduced lateral width as a whole and is even applicable to a bicycle provided with a chain case. Thus, the bicycle has less of a lateral projection, thereby lessening the danger of being hit by a foreign object, thus promoting safety in use of the bicycle.

As many apparently widely different embodiments of this invention may be made without departing from the spirit and scope thereof, it is to be understood that the invention is not limited to the specific embodiments described above except as defined in the appended claims.

What is claimed is:

1. A derailleur for a bicycle for guiding a driving chain axially of a plurality of sprockets forming a multi-stage sprocket assembly so as to switch said chain to a selected one of said sprockets for changing speed, said derailleur comprising:

a fixing member;

a supporting member supported to said fixing member and movable with respect thereto;

a change-over frame supported swingably to said supporting member through a first horixontal shaft, said change-over frame having at least one side plate;

a second tubular shaft arranged co-axially with said first shaft, said second shaft being fixed to one of said supporting member and change-over frame, the inner periphery of said second shaft and the outer periphery of said first shaft forming a tubular spring housing chamber;

a coiled tension spring housed within said spring housing chamber, said spring being retained at one end to a side of said change-over frame and at the other end to a side of said supporting member;
a first pulley supported rotatably to the outer periphery of said second shaft, the axial length of said first pulley being substantially equal to that of said first and second shafts; and,
a second pulley supported rotatably to said change-over.

2. A derailleur for a bicycle according to claim 1, wherein said supporting member is supported swingably to said fixing member through a vertical shaft.

3. A derailleur for a bicycle according to claim 1, wherein said supporting member is movably supported to said fixing member thereto through two parallel link members.

4. A derailleur for a bicycle according to claim 1, wherein said second shaft is fixed to said change-over frame and supported rotatably to said first shaft.

5. a derailleur for a bicycle according to claim 4, wherein said tension spring, which is housed within said tubular spring-housing chamber between said second shaft and said first shaft, is retained at one end to said first shaft and at the other end to said second shaft.

6. A derailleur for a bicycle according to claim 1, wherein said second shaft is fixed to said supporting member and said change-over frame is supported rotatably to said first shaft.

7. A derailleur for a bicycle according to claim 6, wherein said second shaft is integral with said supporting member.

8. A derailleur for a bicycle according to claim 6, wherein said tension spring, which is housed within said tubular spring-housing chamber between said second shaft and said first shaft, is retained at one end to said supporting member and at the other end to said change-over frame.

9. A derailleur for a bicycle according to claim 6, wherein a third tubular shaft is supported rotatably to said first shaft, and said change-over frame is fixed to said third tubular shaft.

* * * * *